(12) United States Patent
Manabe et al.

(10) Patent No.: US 7,939,143 B2
(45) Date of Patent: *May 10, 2011

(54) LIQUID CRYSTAL-CONTAINING COMPOSITION AND LIQUID CRYSTAL DISPLAY DEVICE USING THE SAME

(75) Inventors: Chikara Manabe, Kanagawa (JP); Naoki Hiji, Kanagawa (JP); Takeo Kakinuma, Kanagawa (JP); Tadayoshi Ozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 12/472,862

(22) Filed: May 27, 2009

(65) Prior Publication Data

US 2010/0164848 A1    Jul. 1, 2010

(30) Foreign Application Priority Data

Dec. 26, 2008  (JP) ................. 2008-334113

(51) Int. Cl.
*C09K 19/36* (2006.01)
*C09K 19/54* (2006.01)
*G02F 1/1334* (2006.01)

(52) U.S. Cl. ............... 428/1.1; 252/299.01; 252/299.7; 349/89; 349/91

(58) Field of Classification Search .............. 428/1.1; 252/299.01, 299.7; 349/89, 91
See application file for complete search history.

(56) References Cited

U.S. PATENT DOCUMENTS

| | | | |
|---|---|---|---|
| 5,410,424 A | 4/1995 | Konuma et al. | |
| 5,858,284 A | 1/1999 | Konuma et al. | |
| 7,465,480 B2 * | 12/2008 | Hiji et al. | 428/1.2 |
| 7,833,589 B2 * | 11/2010 | Manabe et al. | 428/1.1 |
| 2005/0244590 A1 | 11/2005 | Hiji et al. | |
| 2008/0067471 A1 | 3/2008 | Hiji et al. | |
| 2008/0187687 A1 | 8/2008 | Manabe et al. | |
| 2009/0162575 A1 * | 6/2009 | Manabe et al. | 428/1.5 |

FOREIGN PATENT DOCUMENTS

| | | |
|---|---|---|
| JP | A-5-80303 | 4/1993 |
| JP | A-6-134293 | 5/1994 |
| JP | A-6-226082 | 8/1994 |
| JP | A-7-120732 | 5/1995 |
| JP | A-9-15568 | 1/1997 |
| JP | A-2005-316243 | 11/2005 |
| JP | A-2008-74897 | 4/2008 |
| JP | A-2008-191420 | 8/2008 |

OTHER PUBLICATIONS

Mar. 24, 2010 Office Action issued in U.S. Appl. No. 12/246,862.
Oct. 1, 2009 Office Action issued in U.S. Appl. No. 12/246,862.

* cited by examiner

*Primary Examiner* — Shean C Wu
(74) *Attorney, Agent, or Firm* — Oliff & Berridge, PLC (57) ABSTRACT

A liquid crystal-containing composition includes a cholesteric liquid crystal and a microcapsule wall that encapsulates the cholesteric liquid crystal, the microcapsule wall includes at least one material selected from polyurethane and polyurea, and the content of the microcapsule wall with respect to 100 parts by weight of the cholesteric liquid crystal is from about 0.1 parts to about 11 parts by weight.

10 Claims, 4 Drawing Sheets

LIQUID CRYSTAL-CONTAINING COMPOSITION AND LIQUID CRYSTAL DISPLAY DEVICE USING THE SAME

CROSS-REFERENCE TO RELATED APPLICATIONS

This application is based on and claims priority under 35 USC 119 from Japanese Patent Application No. 2008-334113 filed on Dec. 26, 2008.

BACKGROUND

1. Technical Field

This invention relates to a liquid crystal-containing composition, and a liquid crystal display device using the same.

2. Related Art

A cholesteric liquid crystal is composed of rod-like molecules that are aligned helically, and reflects light corresponding to the helical pitch thereof by interference (referred to as selective reflection). Therefore, when the helical pitch of a cholesteric liquid crystal is set to a pitch corresponding to the wavelength of red, green, or blue light, a vivid color display can be obtained without using a color filter.

In a cholesteric liquid crystal encapsulated in a cell provided with a pair of substrates each having an electrode, the cholesteric liquid crystal may be aligned in two states: planar (P) alignment or focal conic (F) alignment. The P alignment is a state in which the helical axis is aligned perpendicular to the substrate surface, and can cause selective reflection. The F alignment is a state in which the helical axis is aligned in parallel with the substrate surface, and can transmit light. The alignment state of the liquid crystal can be switched between these two states when a voltage is applied between the electrodes.

Therefore, when a light absorber, such as a black light absorber, is disposed on a back surface of the cell, a bright display exhibiting a selective reflection color is provided under the P alignment state, and a dark display exhibiting the black color of the light absorber is provided under the F alignment state. The P and F alignment states can be stably maintained without supplying power. A memory display which can maintain a display without supplying power thereto is achieved by utilizing such properties.

SUMMARY

According to an aspect of the present invention, a liquid crystal-containing composition is provided that includes a cholesteric liquid crystal and a microcapsule wall that encapsulates the cholesteric liquid crystal, the microcapsule wall including at least one material selected from polyurethane and polyurea, and the content of the microcapsule wall with respect to 100 parts by weight of the cholesteric liquid crystal being from about 0.1 parts to about 11 parts by weight.

BRIEF DESCRIPTION OF THE DRAWINGS

Exemplary embodiments of the present invention will be described in detail based on the following figures, wherein.

DETAILED DESCRIPTION

Exemplary embodiments of the present invention are illustrated below with reference to the following drawings. Units having substantially the same function and effect are denoted by the same reference numerals throughout all the drawings, and repetitive description thereof may be omitted.

Liquid Crystal-Containing Composition

Figure 1:
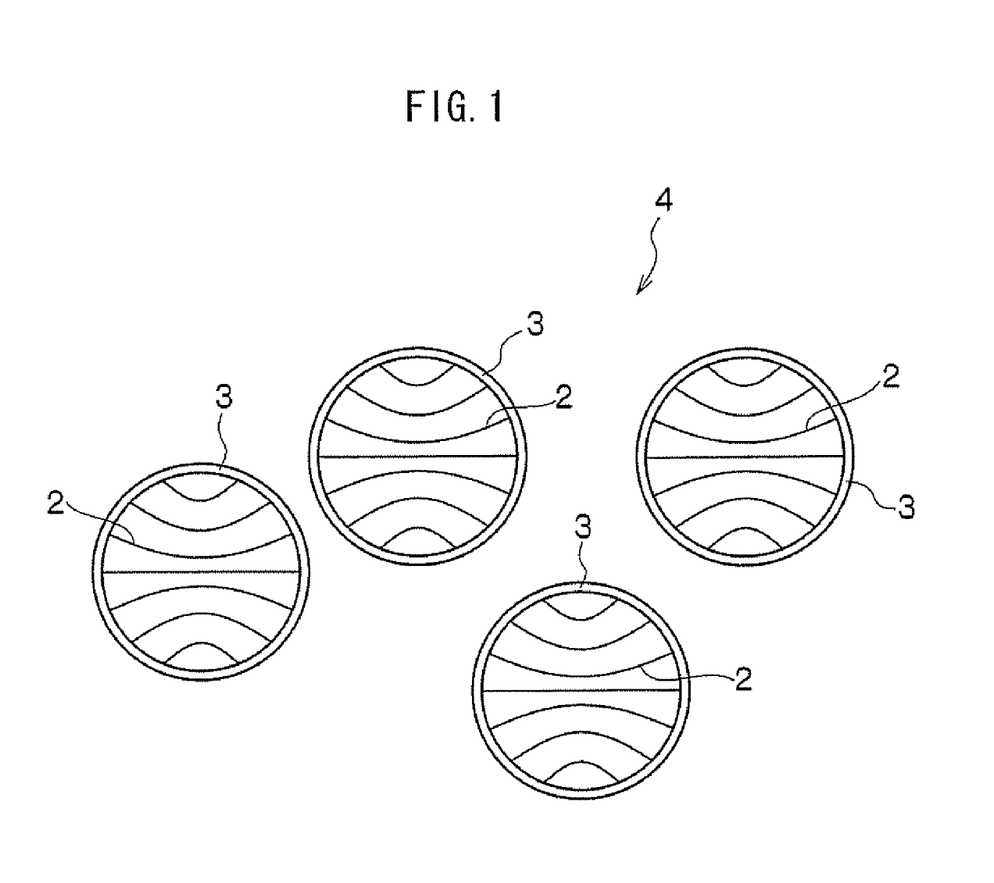
FIG. 1 is a schematic configuration diagram illustrating an example of a liquid crystal-containing composition according to an exemplary embodiment of the invention.
Figure 2:
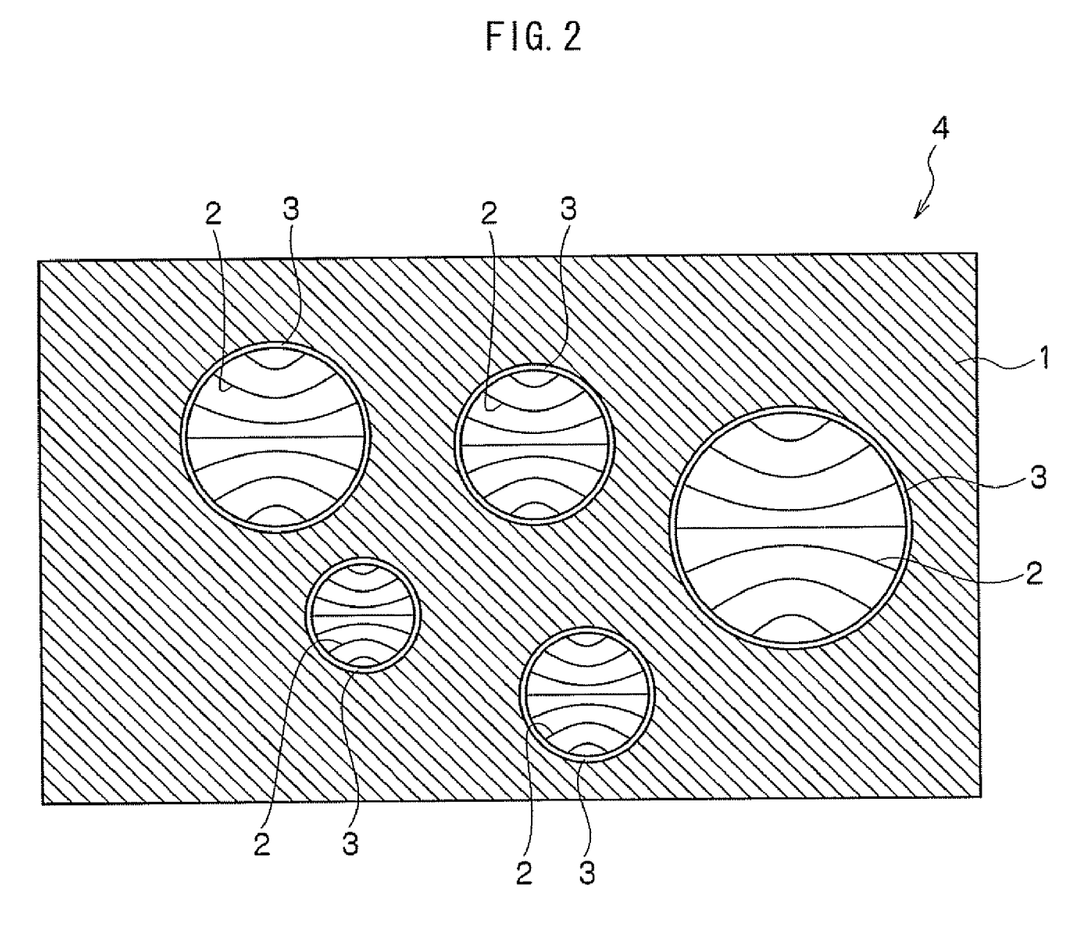
FIG. 2 is a schematic configuration diagram illustrating another example of the liquid crystal-containing composition according to an exemplary embodiment of the invention.

FIG. 1 is a schematic view showing an example of the liquid crystal-containing composition according to an exemplary embodiment of the invention. FIG. 2 is a schematic view showing another example of the liquid crystal-containing composition according to an exemplary embodiment of the invention.

As illustrated in FIG. 1, for example, a liquid crystal-containing composition 4 according to an exemplary embodiment of the invention includes a cholesteric liquid crystal 2 and a microcapsule wall 3 that encapsulates the cholesteric liquid crystal 2. As illustrated in FIG. 2, for example, a liquid crystal-containing composition 4 according to an exemplary embodiment of the invention may be a liquid crystal-containing composition including a cholesteric liquid crystal 2, a microcapsule wall 3 that encapsules the cholesteric liquid crystal 2, and a resin member 1 in which the microcapsule wall 3 is dispersed and held.

Furthermore, a liquid crystal-containing composition 4 according to an exemplary embodiment of the invention may be a slurry composition that contains a cholesteric liquid crystal 2 encapsulated with a microcapsule wall 3 or may be an ink composition in which the slurry composition is mixed with a binder polymer (or a polymeric compound).

In liquid crystal-containing composition 4 according to the exemplary embodiment of the invention, the microcapsule wall 3 includes at least one material selected from polyurethane and polyurea, and liquid crystal-containing composition 4 is formed so as to include about 0.1 to about 11 parts by weight of the microcapsule wall 3 with respect to 100 parts by weight of the cholesteric liquid crystal 2.

In liquid crystal-containing composition 4 according to the exemplary embodiment of the invention, increase in afterimage may be suppressed as a result of the above configuration. In particular, increase in afterimage caused by long-term storage in a high-temperature environment (for example, storage for 250 hours or more in ambient temperature of 60° C. or more) may be suppressed.

"Afterimage" as referred to herein is a phenomenon whereby the reflectance when black display is followed by white display is reduced as compared to a case in which white display is again followed by white display. For example, when a liquid crystal display device using an existing configuration of a liquid crystal-containing composition is stored long-term in a high-temperature environment, there are cases when the afterimage increases as compared to prior to storage (that is, the degree of reflectance reduction as described above increases); however, in a liquid crystal display element according to the exemplary embodiment of the invention using liquid crystal-containing composition 4, the above increase in afterimage may be suppressed.

The liquid crystal-containing composition according to the exemplary embodiment of the invention is described below in detail. The reference numerals are omitted in the following explanation.

First, the cholesteric liquid crystal is described. A cholesteric liquid crystal is a liquid crystal material containing an optically-active compound, and is obtained by, for example, (1) a method of adding, for example, an optically-active compound referred to as a chiral dopant into a nematic liquid crystal, or (2) a method of using a liquid crystal material which itself is optically-active such as a cholesterol derivative. In the former case, examples of the nematic liquid crystal material include known nematic liquid crystal-containing compositions such as cyanobiphenyls, phenyl cyclohexanes, phenyl benzoates, cyclohexyl benzoates, azo methines, azobenzenes, pyrimidines, dioxanes, cyclohexyl cyclohexanes, stilbenes, and tolans. Examples of the chiral dopant include cholesterol derivatives and compounds having an optically-active group such as a 2-methylbutyl group.

The cholesteric liquid crystal may contain an additive such as a dye or particles. The cholesteric liquid crystal may be a gel prepared by using a crosslinkable polymer or a hydrogen-bonding gelling agent. The cholesteric liquid crystal may be either a high, middle, or low-molecular-weight liquid crystal, or may be a mixture thereof. The helical pitch of the cholesteric liquid crystal may be changed according to the type or addition amount of the chiral dopant, or the material of the liquid crystal. The wavelength of the selective reflection may be in the visible wavelength range, ultraviolet wavelength or infrared wavelength range. In order to acquire memory properties, the average particle diameter of the following cholesteric liquid crystal drops (including microcapsule) dispersed in a polymer is preferably at least three times larger than the helical pitch of the cholesteric liquid crystal.

The microcapsule wall is described below.

The microcapsule wall includes at least one material selected from polyurethane and polyurea. The microcapsule wall may include, as necessary, an alignment component, a polyol component, or the like.

The microcapsule wall including the at least one material selected from polyurethane and polyurea can be formed by a known method. Specifically, for example, a core material (e.g., a cholesteric liquid crystal), a polyvalent isocyanate (e.g., a diisocyanate such as tolylene diisocyanate, xylene diisocyanate, hexamethylene diisocyanate, isophorone diisocyanate, or diphenylmethane diisocyanate; a triisocyanate; a tetraisocyanate; an adduct, biuret, or cyanurate of the above diisocyanate, triisocyanate, or tetraisocyanate; or a prepolymer of a polyisocyanate), and a material for forming a microcapsule wall which reacts with the polyvalent isocyanate (e.g., polyol, polyamine, a prepolymer having two or more amino groups, piperazine, or a derivative thereof) are mixed with an aqueous solution of a water-soluble polymer (an aqueous phase solution) or an oleaginous medium (an organic phase solution) that is to be encapsulated. The mixed solution is emulsified and dispersed in water, and then heated to induce a polymer formation reaction at the interface between the aqueous phase and the organic phase, thereby forming the microcapsule wall. However, the method is not limited to the above example.

Among the polyvalent isocyanate components described above, the polyvalent isocyanate component included in the at least one material selected from polyurethane and polyurea preferably includes, in particular, an isocyanurate component having an alicyclic structure as a substituent (also referred to as "component A" hereinafter) and another isocyanate component (also referred to as "component B" hereinafter). By inclusion of an isocyanurate component having an alicyclic structure as a substituent (component A) and another isocyanate component (component B) as polyvalent isocyanate components, high contrast may be realized, particularly at low temperatures.

An isocyanurate that forms the isocyanurate component having an alicyclic structure as a substituent (component A) is preferably at least one selected from the group consisting of isocyanurates represented by the following Structural Formulae (1) and (2) and derivatives thereof. Examples of the derivatives include an isocyanurate of methyl-2,4-bis(isocyanatemethyl)cyclohexane or 1,3,5-trimethylisocyanate cyclohexane. Examples of commercial products of the isocyanurate represented by Structural Formula (1) include TAKENATE D-127N (trade name, manufactured by Mitsui Chemicals Inc.). Examples of commercial products of the isocyanurate represented by Structural Formula (2) include DESMODUR Z4470 (trade name, manufactured by Sumika-Bayer Urethane Co., Ltd.).

Structural Formula (I)

Structural Formula (2)

Other examples of the isocyanurate from which the isocyanurate component having an alicyclic structure as a substituent (component A) derives include isocyanurates of 1,3-cyclopentene diisocyanate, 1,3-cyclohexane diisocyanate, dicyclohexylmethane diisocyanate, or methyl-2,4-cyclohexane diisocyanate.

In order to suppress a decrease in contrast at a low temperature, the content of the isocyanurate component having an alicyclic structure as a substituent (component A) is preferably 1 wt % or more (or about 1 wt % or more), and more preferably 5 wt % or more (or about 5 wt % or more) with respect to the total amount of all isocyanate components. On the other hand, in order to suppress the increase in afterimage, the upper limit of the content is preferably 20 wt % (or about 20 wt %). Here, the all isocyanate components refer to components including the isocyanurate component having an alicyclic structure as a substituent (component A) and another isocyanate component (component B).

The isocyanate from which the isocyanate component (component B) derives may be a polyvalent isocyanate, and examples thereof include a diisocyanate such as tolylene diisocyanate, xylene diisocyanate, hexamethylene diisocyanate, isophorone diisocyanate, or diphenylmethane diisocyanate; a triisocyanate; and a tetraisocyanate. Other examples of the isocyanate include an adduct, biuret, cyanurate (a cyanurate other than the isocyanurate component having an alicyclic structure as a substituent (component A)) of the above diisocyanate, triisocyanate, or tetraisocyanate, and a prepolymer of a polyisocyanate. The content of the isocyanate component (component B) is, for example, determined by excluding an amount of the isocyanurate component having an alicyclic structure as a substituent (component A) from a total amount of the all isocyanate components.

Preferable examples of the polyol component include a polyester polyol and a polyether polyol. In particular, in order to improve (CR) contrast and suppress increase in afterimage, a polyester polyol may be preferable. The polyol component can be introduced in the microcapsule wall by adding a polyol such as polyester polyol or polyether polyol together with the above materials for the microcapsule wall. When the microcapsule wall contains the polyol component, contrast may be improved, and the increase in afterimage may be suppressed.

Examples of the polyester polyol include a polyester polyol obtained by reaction between a dibasic acid (for example, terephthalic acid, isophthalic acid, adipic acid, azelaic acid, or sebacic acid) or a dialkyl ester or a mixture thereof, and a glycol (for example, ethylene glycol, propylene glycol, diethylene glycol, butylene glycol, neopentyl glycol, 1,6-hexane glycol, 3-methyl-1,5-pentanediol, 3,3'-dimethylolheptane, polyoxyethylene glycol, polyoxy propylene glycol, or polytetramethylene ether glycol) or a mixture thereof. Examples of the polyester polyol include those obtained by ring opening polymerization of lactones (for example, polycaprolactone, polyvalerolactone, or poly(β-methyl-γ-valerolactone)).

Examples of the polyether polyol include polyethylene glycol, polyoxyethylene glycol, polyoxypropylene glycol, polytetramethylene glycol, and copolymers thereof.

The weight-average molecular weight of the polyol component is preferably from 20,000 to 1,000,000 (or from about 20,000 to about 1,000,000), more preferably from 20,000 to 500,000 (or from about 20,000 to about 500,000), and still more preferably from 20,000 to 50,000 (or from about 20,000 to about 50,000). When the weight-average molecular weight is larger, particularly, increase in afterimage is effectively suppressed. However, when the weight-average molecular weight is excessively large, compatibility of the components with the solvent decreases due to a decrease in solubility, which may result in formation of uneven microcapsule wall.

The weight-average molecular weight can be measured by a gel permeation chromatography (GPC). As the GPC equipment, 8020 series (manufactured by Tosoh Corporation) is used with the TSK gel columns: G4000HXL, G2500HXL, and G1000HXL (manufactured by Tosoh Corporation, 7.8 mm I.D.×30 cm), and THF (tetrahydrofuran) is used as the eluent. The test conditions are as follows: the sample concentration is 0.2 wt %, the flow rate is 1 ml/min, the sample injection amount is 50 μl, and the measurement temperature is 40° C. A differential refractometer is used for the measurement.

The content of the polyester polyol is preferably from 1 wt % to 50 wt %, more preferably from 5 wt % to 25 wt %, and still more preferably from 10 wt % to 15 wt % with respect to the total amount of the components constituting the microcapsule wall. When the content of the polyester polyol is within this range, contrast may be effectively improved, and increase in afterimage may be suppressed.

The microcapsule wall may include an alignment component. For example, a homeotropic alignment component such as an alkyl group as the alignment component may be introduced to an interface between the cholesteric liquid crystal and the polymer or introduced within the polymer. The planner alignment property, which is intrinsic to the polymer of the microcapsule wall, may be cancelled by the homeotropic alignment property of the homeotropic alignment component, whereby the orientation constraint is weakened. As a result of this, a cholesteric liquid crystal layer having no curvature is formed, whereby a substantially flat cholesteric liquid crystal layer without bending may be obtained, and the color purity and display contrast may be improved. In addition, the orientation constraint is so weak that the liquid crystal molecules contacting with the polymer exhibit little energy difference regardless of the alignment direction, and thus may be stable over time in the P alignment and the F alignment states. A homeotropic alignment component is described in detail in Japanese Patent Application Laid-Open (JP-A) Publication No. 2005-316243.

The content of the microcapsule wall is from 0.1 parts to 11 parts by weight (or from about 0.1 parts to about 11 parts by weight) with respect to 100 parts by weight of the cholesteric liquid crystal. When the content of the microcapsule wall is within this range, increase in afterimage (particularly, increase in afterimage due to long-term storage in high-temperature conditions) may be suppressed.

With a view to this suppression of increase in afterimage, the content of the microcapsule wall is preferably 10 parts by weight or less (or about 10 parts by weight or less), and more preferably 8 parts by weight or less (or about 8 parts by weight or less), with respect to 100 parts by weight of the cholesteric liquid crystal. Further, with a view to the physical strength of the microcapsule wall, the content of the microcapsule wall is preferably 0.1 parts by weight or more (or about 0.1 parts by weight or more), and with a view to improved contrast, is preferably 3 parts by weight or more (or about 3 parts by weight or more), more preferably 7 parts by weight or more (or about 7 parts by weight or more), and yet more preferably 8 parts by weight or more (or about 8 parts by weight or more), with respect to 100 parts by weight of the cholesteric liquid crystal.

For example, the liquid crystal-containing composition according to the exemplary embodiment of the invention may be used, as described above, by dispersing the cholesteric liquid crystal encapsulated with the microcapsule wall into a binder material, and by applying the dispersion liquid to various type of surfaces. In the liquid crystal-containing composition of the exemplary embodiment of the invention, since the liquid crystal is protected by the microcapsules, other functional layers may be formed on a layer containing the liquid crystal, and may have excellent mechanical strength against compression or bending. Accordingly, the liquid crystal-containing composition of the exemplary embodiment of the invention may have a wide range of applications. When a curable binder is used as the binder material, a resin member can be formed in which the cholesteric liquid crystals encapsulated with the microcapsule walls are dispersed and held by forming a layer from the composition and curing it.

The liquid crystal-containing composition according to the exemplary embodiment of the invention can be applied to a substrate by any methods. Examples of the methods include a printing method such as screen printing, letterpress printing, gravure printing, planographic printing, or flexographic printing; and coating method such as spin coating, bar coating, dip coating, roll coating, knife coating, or die coating.

The liquid crystal-containing composition according to the exemplary embodiment of the invention can be used, for example, in display devices, image/information-recording devices, spatial light modulators, and the like. In particular, it is preferable to use the liquid crystal-containing composition of the exemplary embodiment of the invention in display devices such as liquid crystal display devices. Hereinafter, the liquid crystal display device according to the exemplary embodiment of the invention will be described.

Figure 3:
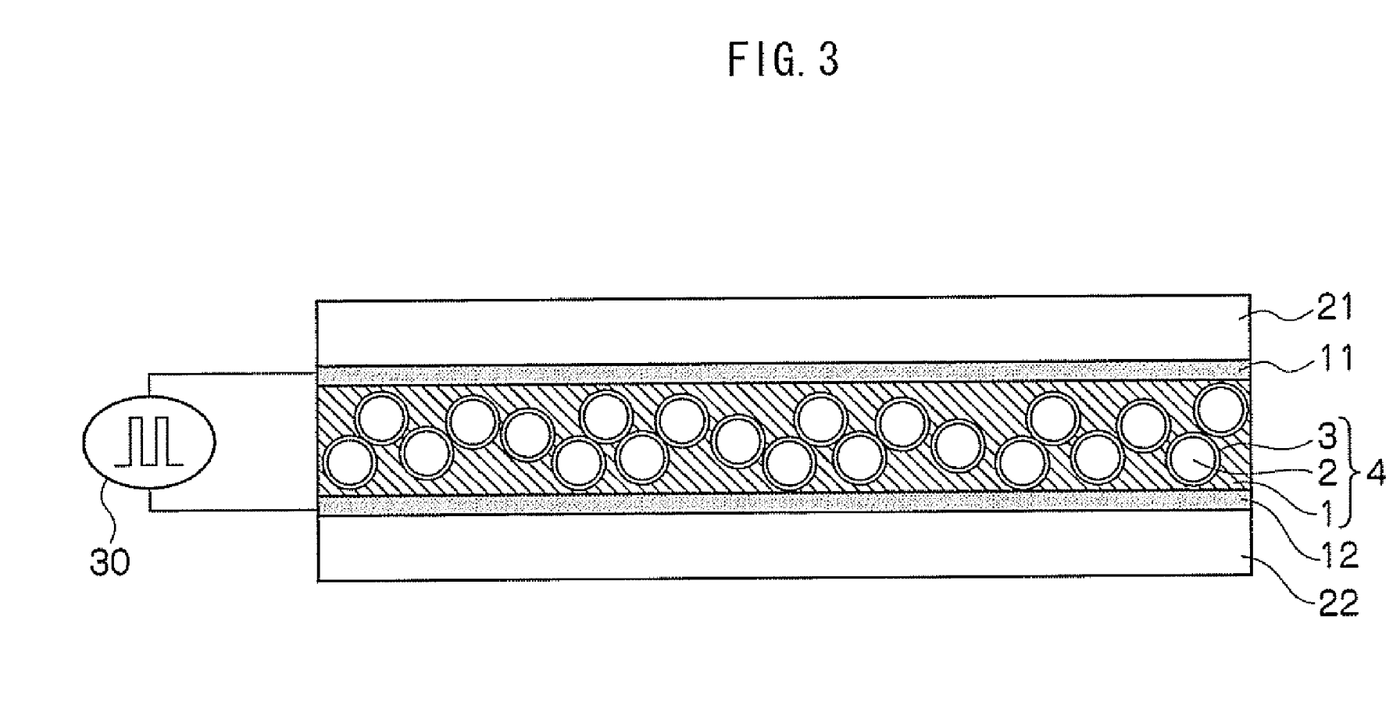
FIG. 3 is a schematic configuration diagram illustrating an example of a liquid crystal display device according to an exemplary embodiment of the invention.

The liquid crystal display device according to the exemplary embodiment of the invention has a configuration in which the liquid crystal-containing composition according to the exemplary embodiment of the invention is held between a pair of electrodes. More specifically, as shown in FIG. 3, a liquid crystal-containing composition 4 is held between substrates 21 and 22 having an electrode 11 and 12, respectively, to which voltage pulses are applied by a driving circuit 30 to provide a display. As a display background, a light absorption member may be provided between the liquid crystal-containing composition 4 and the electrode 12, or on the back of the substrate 22. Examples of the material of the substrate 21 or 22 include glass and a resin (for example, a transparent dielectric material such as polyethylene terephthalate, polyether sulfone, polycarbonate, or polyolefin). Examples of the material of the electrode 11 or 12 include a transparent conductive film such as a film of an indium tin oxide or zinc oxide.

In the liquid crystal display device shown in FIG. 3, the liquid crystal-containing composition 4 has a configuration in which the cholesteric liquid crystal 2 encapsulated with the microcapsule wall 3 is dispersed and held in the resin member 1.

In the liquid crystal display device according to the exemplary embodiment of the invention, the liquid crystal-containing composition of the exemplary embodiment of the invention is adapted to emphasize the optical difference between the P alignment and the F alignment memory states of the cholesteric liquid crystal. Therefore, the display mode may adopt, in addition to the above-described selective reflection mode, a scattering-transmission mode using a difference in the light scattering intensities between the P alignment and the F alignment, an optical rotatory mode using a difference in the optical rotations therebetween, or a birefringence mode using a difference in birefringences therebetween. In this case, a polarizing plate or a retardation film may be used as an auxiliary member. Further, the liquid crystal may contain a dichroic dye to provide a display in a guest-host mode.

The methods of driving the liquid crystal display device according to the exemplary embodiment include known driving methods such as (1) a segment driving method of driving liquid crystal held between two electrodes patterned in the display shape, (2) a simple matrix driving method of holding a liquid crystal-containing composition between a pair of cross (for example, orthogonal) striped electrode substrates, scanning the respective lines one by one, and thus forming an image, (3) an active matrix driving method of placing active devices such as a thin film transistor, a thin film diode, or a MIM (metal-insulator-metal) device in each active device and driving the liquid crystal by the active device, (4) an optical driving method of superposing a photoconductor layer and holding them between a pair of electrodes, forming an image while projecting an optical image and applying a voltage at the same time, (5) a thermal driving method of holding a liquid crystal-containing composition between a pair of electrodes, inducing transition to the P alignment by application of a voltage, and then forming an image by heating it to a phase transition temperature or more, for example, by a laser or a thermal head, and (6) an electrostatic driving method of coating a liquid crystal-containing composition on an electrode substrate and forming an image, for example, with a stylus head or an ion head.

EXAMPLES

Hereinafter, the present invention will be explained with reference to examples in details, but the invention is not limited to these examples. Unless otherwise specified, "part" means "parts by weight".

Example A

Example A1

86.25 parts of a nematic liquid crystal E7 (manufactured by Merck & Co., Inc.), 11.0 parts of chiral dopant R811 (manufactured by Merck & Co., Inc.), and 2.75 parts of chiral dopant R1011 (manufactured by Merck & Co., Inc.) are mixed to obtain 100 parts of a cholesteric liquid crystal which selectively reflects a wavelength of 650 nm. The cholesteric liquid crystal, 4.9 parts of polyvalent isocyanate (trade name: TAKENATE D-110N, manufactured by Mitsui Chemicals Inc.), 0.9 parts of DESMODUR Z4470 (trade name, manufactured by Sumika-Bayer Urethane Co., Ltd.), 1.7 parts of octadecanol (manufactured by Aldrich) as a precursor of the homeotropic alignment component, and 0.5 parts of polyester polyol (trade name: TAKELAC A385, manufactured by Mitsui Chemicals Inc.) are dissolved in 1,000 parts of ethyl acetate to make an organic phase composition. The organic phase composition is then added to 10,000 parts of a 1% aqueous polyvinyl alcohol solution, and stirred and dispersed with a mixer to make an o/w (oil-in-water) emulsion having a volume average particle diameter of 7 μm.

To the emulsion, 100 parts of a polyallylamine 10% aqueous solution (manufactured by Nitto Boseki Co., Ltd., molecular weight: 15,000) are added, and heated at 70° C. for 2 hours to form a microcapsule wall containing polyurea as the wall material. In this manner, a liquid crystal-containing composition containing a microcapsule in which a cholesteric liquid crystal is encapsulated with the microcapsule wall is prepared. The obtained microcapsule is collected by centrifugation, and mixed with an aqueous polyvinyl alcohol solution to make a liquid crystal microcapsule coating composition. The amount of the microcapsule wall in the liquid crystal-containing composition included in the obtained liquid crystal microcapsule coating composition is 8 parts, with respect to the 100 parts by weight of cholesteric liquid crystal.

Subsequently, the liquid crystal microcapsule coating liquid is applied to a commercially available ITO-deposited PET resin film by using an applicator so that dry film thickness is 30 μm. A dispersion of carbon black in an aqueous polyvinyl alcohol solution is applied thereto so that dry film thickness is 3 μm to make a light absorbing layer. Aside from this, a two-component urethane adhesive is applied to another ITO-vapor deposited PET resin film so that dry film thickness is 3 μm. The resultant is bonded to the above substrate coated with the liquid crystal microcapsule coating liquid, thereby obtaining a liquid crystal display device.

The afterimage index and CR (contrast) of the obtained liquid crystal display device are evaluated. The results are shown in Table 1.

CR (Contrast)

The voltage (V)-reflectance (Y) characteristic of the obtained liquid crystal display device is measured, and the ratio between the maximum reflectance and the minimum reflectance is defined as CR (contrast). A symmetrical rectangular wave pulse (reset voltage) having a voltage of 600 V, a frequency of 1 kHz, and a length of 1 second is applied to the space between the upper and lower electrodes of the liquid crystal display device, and a bright (white) screen is uniformly displayed on the liquid crystal display (white reset). Subsequently, a writing voltage V (a symmetrical rectangular pulse having a frequency of 1 kHz and a length of 200 msec) is applied, and the luminous reflectance is measured 3 seconds after the application. This measurement is repeated while changing the writing voltage stepwise, and thereby the voltage-reflectance characteristic Ywr (V) is determined. Reflectance is measured in terms of luminous reflectance with a spectrophotometer CM-2022 (manufactured by Minolta Co., Ltd.). The CR evaluation is conducted with the liquid crystal display device at a temperature of 25° C.

Afterimage Index Increase Rate Due to Storage in High-Temperature Environment

The obtained liquid crystal display device is stored at 70° C. (in a high-temperature environment), the afterimage index is measured prior to initiation of high-temperature environment storage (0 hours), 20 hours after the initiation of high-temperature environment storage, 90 hours after the initiation of high-temperature environment storage and 190 hours after the initiation of high-temperature environment storage, and the least square method is used to calculate the afterimage index increase rate (%/h) per unit hour.

Afterimage Index

Figure 4:
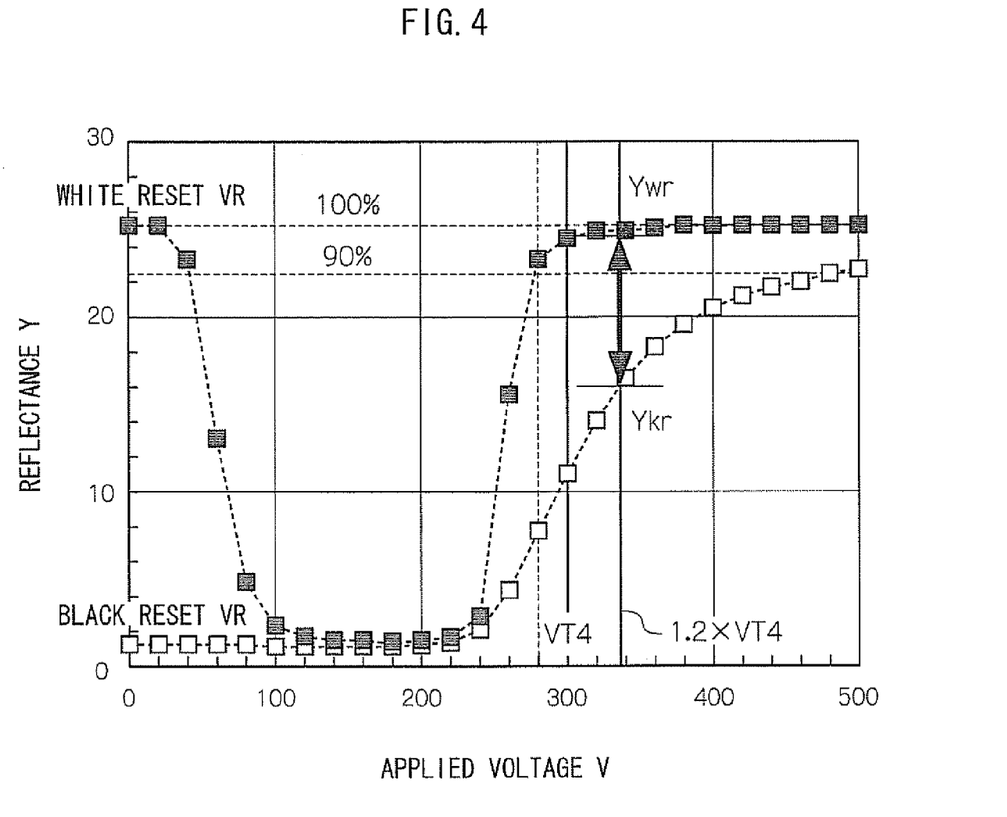
FIG. 4 is a graph explaining afterimage index.

The afterimage index is measured as described below. First, as described in the evaluation method of CR (contrast), the voltage-reflectance characteristic Ywr (V) of a white reset is determined. Subsequently, the same measurement is conducted at a reset voltage of 200 V, and thereby the electric current-reflectance characteristic Ykr (V) of a dark (black) reset is determined. In the voltage-reflectance characteristic of the white reset, the voltage at which the reflectance reaches 90% of the maximum value is defined as VT4. An example of the voltage-reflectance characteristic Ywr (V) of a white reset and the electric current-reflectance characteristic Ykr (V) of a dark (black) reset is shown in FIG. 4.

With these values, the afterimage index (%) is defined by the following formula:

$$\text{Afterimage index (\%)} = (Ywr(1.2 \times VT4) - Ykr(1.2 \times VT4))/Ykr(1.2 \times VT4) \times 100$$

Examples A2 to A6, Comparative Examples A1, A2

Liquid crystal display devices are prepared in a similar manner to in Example A1 and evaluated except that the addition amounts of the polyvalent isocyanate, the homeotropic alignment component precursor, the polyester polyol and the polyallylamine 10% aqueous solution are changed as shown in Table 1. The content amount of the microcapsule wall and the evaluation results are shown in Table 1.

Examples B1 to B3, Comparative Example B1

Liquid crystal display devices are prepared in a similar manner to in Example A1 and evaluated except that the addition amounts of the polyvalent isocyanate, the homeotropic alignment component precursor, the polyester polyol and the polyallylamine 10% aqueous solution are changed as shown in Table 1. The content amount of the microcapsule wall and the evaluation results are shown in Table 1.

Examples C1 to C3, Comparative Example C1

Liquid crystal display devices are prepared in a similar manner to in Example A1 and evaluated except that the addition amounts of the polyvalent isocyanate, the homeotropic alignment component precursor, the polyester polyol and the polyallylamine 10% aqueous solution are changed as shown in Table 1. The content amount of the microcapsule wall and the evaluation results are shown in Table 1.

Examples D1 to D3, Comparative Example D1

Liquid crystal display devices are prepared in a similar manner to in Example A1 and evaluated except that the addition amounts of the polyvalent isocyanate, the homeotropic alignment component precursor, the polyester polyol and the polyallylamine 10% aqueous solution are changed as shown in Table 1. The content amount of the microcapsule wall and the evaluation results are shown in Table 1.

TABLE 1

| | Addition amount (parts by weight) | | | | | Microcapsule | Evaluation | |
| | Polyvalent isocyanate | | Homeotropic | | Polyallylamine | wall content | | Afterimage index |
| | TAKENATE D-110N | DESMODUR Z4470 | alignment component precursor | Polyester polyol | 10% aqueous solution | (parts by weight) | Contrast | increase rate (%/h) |
|---|---|---|---|---|---|---|---|---|
| Example A1 | 4.9 | 0.9 | 1.7 | 0.5 | 100 | 8.0 | 7.0 | 2.7 |
| Example A2 | 3.7 | 0.7 | 1.3 | 0.3 | 100 | 6.0 | 5.6 | 0 |
| Example A3 | 1.8 | 0.3 | 0.7 | 0.2 | 100 | 3.0 | 4.0 | 0 |
| Example A4 | 0.6 | 0.1 | 0.2 | 0.1 | 100 | 1.0 | 3.0 | 0 |
| Example A5 | 6.2 | 1.1 | 2.2 | 0.6 | 100 | 10.0 | 8.5 | 5.2 |
| Example A6 | 6.8 | 1.2 | 2.4 | 0.6 | 100 | 11.0 | 9.0 | 5.5 |
| Comparative Example A1 | 8.6 | 1.5 | 3.0 | 0.8 | 100 | 14.0 | 8.5 | 20.6 |
| Comparative Example A2 | 12.9 | 2.3 | 4.6 | 1.2 | 100 | 21.0 | 9.6 | 40 |
| Example B1 | 5.5 | 0 | 2.0 | 0.5 | 100 | 8.0 | 7.2 | 2.5 |
| Example B2 | 2.1 | 0 | 0.7 | 0.2 | 100 | 3.0 | 3.9 | 0 |
| Example B3 | 7.6 | 0 | 2.7 | 0.7 | 100 | 11.0 | 8.4 | 5.2 |
| Comparative | 9.7 | 0 | 3.4 | 0.9 | 100 | 14.0 | 8.0 | 20 |

TABLE 1-continued

| | Addition amount (parts by weight) | | | | | Microcapsule | Evaluation | |
| | Polyvalent isocyanate | | Homeotropic | | Polyallylamine | wall content | | Afterimage index |
| | TAKENATE D-110N | DESMODUR Z4470 | alignment component precursor | Polyester polyol | 10% aqueous solution | (parts by weight) | Contrast | increase rate (%/h) |
|---|---|---|---|---|---|---|---|---|
| Example B1 | | | | | | | | |
| Example C1 | 6.3 | 1.1 | 0 | 0.6 | 100 | 8.0 | 4.0 | 0.8 |
| Example C2 | 2.4 | 0.4 | 0 | 0.2 | 100 | 3.0 | 3.6 | 0 |
| Example C3 | 8.7 | 1.5 | 0 | 0.8 | 100 | 11.0 | 4.2 | 1.2 |
| Comparative Example C1 | 11.0 | 1.9 | 0 | 1.0 | 100 | 14.0 | 4.0 | 2.5 |
| Example D1 | 5.2 | 0.9 | 1.8 | 0 | 100 | 8.0 | 7.1 | 2.9 |
| Example D2 | 2.0 | 0.3 | 0.7 | 0 | 100 | 3.0 | 3.9 | 0 |
| Example D3 | 7.2 | 1.3 | 2.5 | 0 | 100 | 11.0 | 9.1 | 6.2 |
| Comparative Example D1 | 9.2 | 1.6 | 3.2 | 0 | 100 | 14.0 | 8.4 | 23 |

In addition, the polyvalent isocyanates indicated above by product names consist of the isocyanate types and modified forms thereof represented as follows.

From the above results, it is evident that the afterimage index increase rate is lower in the Examples than in the Comparative Examples. Further, it is evident that contrast is particularly improved in Examples A1 to A3, A5 and A6 as compared to Example A4.

The foregoing description of exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its applications, thereby enabling others skilled in the art to understand the invention for various embodiments and with the various modifications as are suited to particular use contemplated. It is intended that the scope of the invention be defined by the following claims and their equivalents.

What is claimed is:

1. A liquid crystal-containing composition, comprising a cholesteric liquid crystal and a microcapsule wall that encapsulates the cholesteric liquid crystal, the microcapsule wall comprising at least one material selected from polyurethane and polyurea, and the content of the microcapsule wall with respect to 100 parts by weight of the cholesteric liquid crystal being from about 0.1 parts to about 11 parts by weight, wherein the at least one material selected from polyurethane and polyurea comprises an isocyanurate component having an alicyclic structure as a substituent and another isocyanate component.

2. The liquid crystal-containing composition of claim 1, wherein the content of the microcapsule wall with respect to 100 parts by weight of the cholesteric liquid crystal is from about 3 parts to about 11 parts by weight.

3. The liquid crystal-containing composition of claim 1, wherein the microcapsule wall comprises a homeotropic alignment component.

4. The liquid crystal-containing composition of claim 1, wherein the microcapsule wall comprises a polyol component.

5. The liquid crystal-containing composition of claim 1, wherein the average particle diameter of the cholesteric liquid crystal is at least three times larger than the helical pitch of the cholesteric liquid crystal.

6. The liquid crystal-containing composition of claim 4, wherein the weight-average molecular weight of the polyol component is from about 20,000 to about 1,000,000.

7. The liquid crystal-containing composition of claim 1, wherein the isocyanurate component having an alicyclic structure as a substituent is selected from the group consisting of isocyanurates represented by the following Structural Formulae (1) and (2) and derivatives thereof.

Structural Formula (1)

Structural Formula (2)

8. The liquid crystal-containing composition of claim 1, wherein the content of the isocyanurate component having an alicyclic structure as a substituent is from about 1 wt % to about 20 wt % with respect to the total amount of all isocyanate components.

9. A liquid crystal display device, comprising a pair of electrodes and the liquid crystal composition of claim 1 held between the electrodes.

10. A liquid crystal display device, comprising:
a first substrate and a second substrate;
a first electrode provided on the first substrate and a second electrode provided on the second substrate;
the liquid crystal composition of claim 1 held between the first and second electrodes; and
a drive circuit that supplies a voltage pulse.

* * * * *